(No Model.)
G. B. DUNSTAN.
COOKING ATTACHMENT FOR STOVES.
No. 588,696. Patented Aug. 24, 1897.
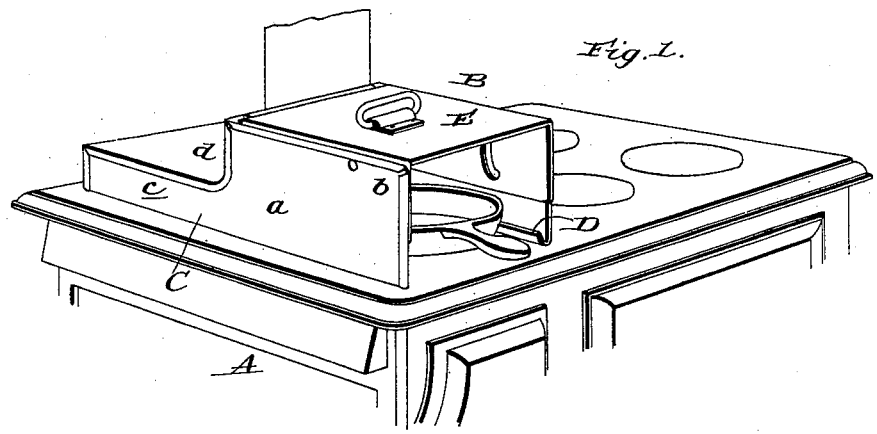
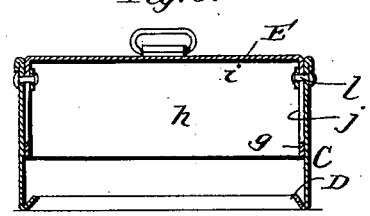
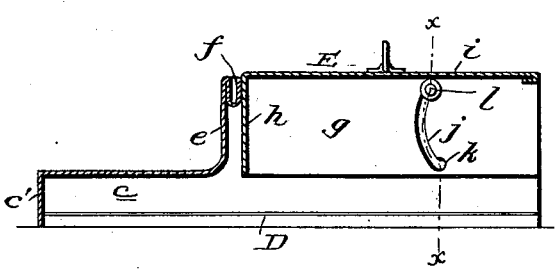
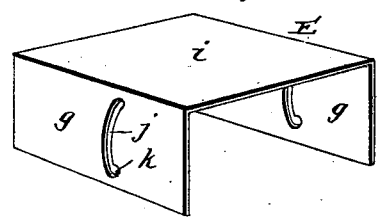
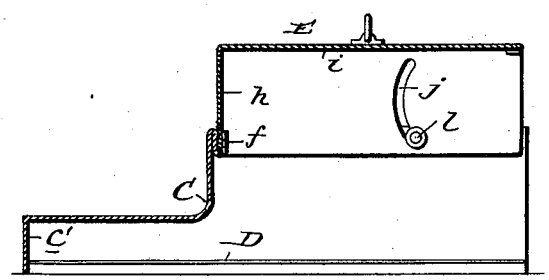
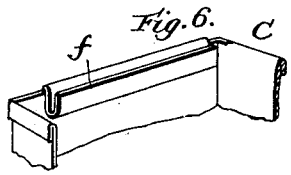
Witnesses:
C. H. Raeder
Jessie G. Croney
Inventor
G. B. Dunstan
By James J. Shelly
Attorney
THE NORRIS PETERS CO., PHOTO-LITHO., WASHINGTON, D.C.

UNITED STATES PATENT OFFICE.

GEORGE B. DUNSTAN, OF MINNEAPOLIS, MINNESOTA, ASSIGNOR TO WALTER R. BROWN, OF SAME PLACE.

COOKING ATTACHMENT FOR STOVES.

SPECIFICATION forming part of Letters Patent No. 588,696, dated August 24, 1897.

Application filed March 29, 1897. Serial No. 629,818. (No model.)

*To all whom it may concern:*

Be it known that I, GEORGE B. DUNSTAN, a subject of the Queen of Great Britain, residing at Minneapolis, in the county of Hennepin and State of Minnesota, have invented certain new and useful Improvements in Cooking Attachments for Stoves; and I do declare the following to be a full, clear, and exact description of the invention, such as will enable others skilled in the art to which it appertains to make and use the same.

My invention relates to improvements in that class of hoods which are designed to rest upon a stove-top over two holes therein and also over a utensil seated over one hole, so as to convey odors of cooking into the stove and enable such odors to escape up the chimney, and thus prevent the dissemination of the same through a house.

One of the objects of my invention is to provide a stove-hood for the purpose mentioned which while very cheap and simple is adapted to be readily increased and diminished in height to adapt it to receive utensils of various heights, between a skillet and kettle, beneath it.

Another object is to provide a hood adapted to catch and hold grease present in the vapors rising from the cooking, and thus preserve the top of the stove in a clean condition, so as to avoid the necessity of frequently cleaning the same, and still another object is to provide a hood which is so constructed that one part may be utilized as a rest for dishes that are to be kept warm.

With the foregoing ends in view the invention will be fully understood from the following description and claims when taken in conjunction with the annexed drawings, in which—

Figure 1 is a perspective view of a part of an ordinary cooking-stove with my improved hood in position thereon and a frying-pan, said hood being shown as diminished in height. Fig. 2 is a longitudinal central section of the hood. Fig. 3 is a transverse section taken in the plane indicated by the line $xx$ of Fig. 2. Fig. 4 is a longitudinal central section showing the hood as increased in height to receive a tall kettle or the like beneath it. Fig. 5 is a detail perspective view showing the adjustable top of the hood; and Fig. 6 is a detail view of a portion of the hood-body, showing the rest for the adjustable top when the same is in its raised position.

In the said drawings similar letters designate corresponding parts in all of the several views, referring to which—

A indicates a stove, which may be any ordinary cooking-stove and which forms no part of my invention, but is here illustrated for the purpose of showing the application of my improved device.

B indicates my improved hood. This hood, which may be formed of copper, sheet-iron, or other suitable metal, is of a form substantially as shown, and comprises the body C, having the side walls $a$, which are higher at their forward portions, as shown at $b$, than at their rear portions, (indicated by $c$,) the end wall $c'$, the top wall $d$, which is connected to the end wall $c'$ and the portions $c$ of the side walls $a$, and the vertical transverse wall $e$, which is connected with the shouldered portions of the side walls $a$ and terminates at its upper edge in the downwardly and upwardly bent flange $f$, designed to form a rest for the adjustable top, presently described, when the same is raised. The top wall $d$ is arranged at a much less altitude than the upper edges of the portions $b$ of the side walls $a$, and it is designed to serve as a convenient rest for a pan or other cooking utensil when it is desired to keep the contents of the same warm.

D indicates troughs or receivers, there being one arranged on the inner side of each side wall $a$ of the body C and at the base thereof, as better shown in Fig. 1. These troughs or receivers are designed to catch and hold any grease or water of condensation that may rise from the cooking vessel within the hood, the walls of the hood being designed to guide such grease and water to the troughs, as is obvious.

E indicates the adjustable section or top of the hood. This adjustable section or top is preferably of the proportional size illustrated, so as to rest between the side walls $a$ in front of the transverse wall $e$, and it comprises the side walls $g$, vertical transverse wall $h$, and horizontal wall $i$. The said side walls $g$ of the section E are provided with circular slats $j$, which preferably have offsets $k$ at their lower ends, and are designed for the passage of the bolts $l$, which connect the section or top E to the side walls $a$ of the body C, as shown. In virtue of this construction it will be observed that the section E may be made to rest in the position shown in Fig. 2 when the frying-pan or other low cooking vessel is beneath the hood, and may also be raised to the position shown in Fig. 4, so as to permit of a kettle or other tall utensil being placed beneath it. It will also be observed that when the section E is raised and moved forward, so as to seat the bolts $l$ in the offsets of slots $j$, the lower edge of the wall $h$ may be seated in the flange or ledge $f$ of the body C, so as to secure the said section E in its raised position.

The entire front of the hood is open, as shown, so as to permit of the ready introduction and removal of a cooking utensil, and also to permit of the contents thereof being conveniently inspected and stirred when necessary.

In the practical operation of my invention one of the stove-lids is first removed from the stove-top and the lowest portion of the hood is placed over such opening. A second lid may or may not be removed, according to the amount of heat required for cooking. The frying-pan or utensil is then introduced through the open end of the hood, when the draft caused by the removal of the cover at the lower portion of the hood will carry off the odors, vapors, &c., and thus prevent the dissemination of the same through the house in which the cooking is taking place.

It will be observed from the foregoing that a cooking vessel may be placed upon the top $d$ of the hood, which is brought approximately close to the stove-top, and the contents of said vessel cooked as effectually as if placed directly upon the stove.

A device of this character is very simple and is so durably constructed that none of its parts can get out of order, and it can be manufactured at a very small expense.

Having thus described my invention, what I claim is—

1. A stove-hood comprising the body having an end wall, a top wall and side walls extending beyond the top wall, and a vertically-adjustable section or top connected with the extended portions of the side walls, substantially as specified.

2. A stove-hood comprising the body having an end wall, a top wall and side walls extending beyond the top wall, a vertically-adjustable section or top arranged between the extended portions of the side walls of the body and having curvilinear slots in its side walls, and bolts extending through said slots and the side walls of the body, substantially as specified.

3. In a stove-hood, the combination with the body having an end wall, side walls having their rear portions reduced in height, the top wall connected at the end wall and reduced portions of the side walls, and the intermediate transverse wall terminating at its upper edge in a downwardly and upwardly bent flange; of the vertically-adjustable section or top arranged between the extended portions of the side walls and having the top wall, end wall and the side walls provided with curvilinear slots terminating at their lower ends in offsets, and connecting-bolts extending through said slots and through the side walls of the body, substantially as specified.

4. A stove-hood adapted to be placed over two openings of a stove-top and comprising the low, rear portion adapted to rest over one opening and having the flat top adapted to support a vessel, and a front portion of greater height than the rear portion adapted to rest over the other opening and receive a vessel within it; the said front portion communicating with the rear portion and having a rear transverse wall connected to and extending upwardly from the forward end of the top wall of the low rear portion, substantially as specified.

In testimony whereof I affix my signature in presence of two witnesses.

GEORGE B. DUNSTAN.

Witnesses:
WM. H. HALLAM,
FRANK K. PRATT.